United States Patent [19]

Tsuji

[11] Patent Number: 4,597,306
[45] Date of Patent: Jul. 1, 1986

[54] TRANSMISSION SHIFT LEVER SUPPORTING STRUCTURE

[75] Inventor: Shinsaku Tsuji, Ebina, Japan

[73] Assignee: Nissan Motor Co., Ltd., Yokohama, Japan

[21] Appl. No.: 782,162

[22] Filed: Oct. 2, 1985

Related U.S. Application Data

[63] Continuation of Ser. No. 476,711, Mar. 18, 1983, abandoned.

[30] Foreign Application Priority Data

Apr. 14, 1982 [JP] Japan .................. 57-62240

[51] Int. Cl.⁴ .................................. G05G 9/18
[52] U.S. Cl. .................. 74/473 P; 74/473 R; 403/138
[58] Field of Search .............. 74/473 R, 473 P; 403/133, 138, 144; 308/1 A

[56] References Cited

U.S. PATENT DOCUMENTS

| | | | |
|---|---|---|---|
| 3,273,909 | 9/1966 | Muller et al. | 403/138 X |
| 3,820,908 | 6/1974 | Maxeiner et al. | 403/138 X |
| 4,086,822 | 5/1978 | Kuroda | 74/473 R |
| 4,143,560 | 3/1979 | Kinkade et al. | 74/473 |
| 4,287,784 | 9/1981 | Cedendahl | 74/473 R |
| 4,355,543 | 10/1982 | Ikemoto et al. | 74/473 P |
| 4,455,883 | 6/1984 | Radcliffe | 74/473 R X |

FOREIGN PATENT DOCUMENTS 1655136 8/1971 Fed. Rep. of Germany .
2460769 7/1976 Fed. Rep. of Germany .

Primary Examiner—Allan D. Herrmann
Attorney, Agent, or Firm—Schwartz, Jeffery, Schwaab, Mack, Blumenthal & Evans

[57] ABSTRACT

A fail-safe means is arranged in a transmission shift lever supporting structure for assuring the operative pivotal movement of the shift lever even when the pivotally supported spherical portion of the shift lever is accidentally disengaged from the bearing member in the originally set socket member of the structure. The fail-safe means comprises a stopper plate member stationarily arranged near the socket member. The stopper plate member has therethrough a stopper opening through which one end portion of the shift lever other than the spherical portion passes. The stopper opening is sized smaller than the spherical portion of the shift lever so that upon disengagement of the spherical portion from the bearing member, the spherical portion becomes engaged with the stopper plate member and is prevented from passing through the stopper opening.

8 Claims, 9 Drawing Figures

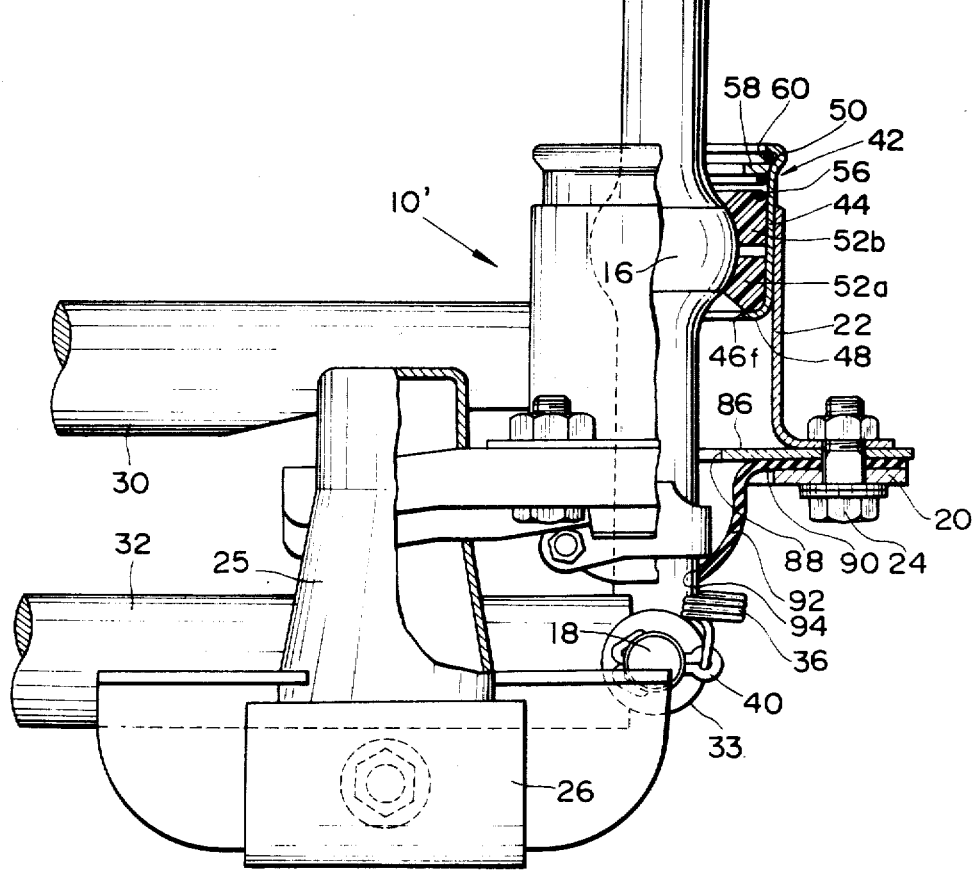

TRANSMISSION SHIFT LEVER SUPPORTING STRUCTURE

This application is a continuation of application Ser. No. 476,711, filed Mar. 18, 1983, now abandoned.

BACKGROUND OF THE INVENTION

1. Field of the Invention

The present invention relates in general to a shift lever supporting structure of a vehicle transmission, and more particularly to a shift lever supporting structure equipped with a so-called fail-safe means which can operatively support the shift lever even when the shift lever is accidentally disengaged from the originally installed bearing or supporting member during handling of the shift lever.

2. Description of the Prior Art

In a manual transmission system of a motor vehicle, various measures have been proposed for pivotally supporting a shift lever which is mounted in the driver's compartment of the vehicle for manual operation of the transmission. By manually moving the shift lever about the pivoted portion thereon in the fore-and-aft and/or right and left directions, the movement of the shift lever is transmitted to the internal gear mechanism of the transmission to effect a gear change of the transmission. However, many supporting structures hitherto used are not provided with a so-called fail-safe means which assures the operative pivotal movement of the shift lever even when the originally installed shift lever supporting structure breaks during the shifting operation of the shift lever.

SUMMARY OF THE INVENTION

Therefore, it is an essential object of the present invention to provide a transmission shift lever supporting structure which is equipped with a fail-safe means which can operatively support the shift lever even when the shift lever is accidently disengaged from the originally installed bearing or supporting means during operation of the shift lever.

According to the present invention, there is provided a shift lever supporting structure for pivotally supporting a shift lever which is formed with an enlarged spherical portion. The structure comprises a holding member secured to a rigid structure of the vehicle, a socket member secured to the holding member, a bearing member held in the socket member and receiving therein the spherical portion of the shift lever so that the shift lever is pivotal about the spherical portion thereof relative to the fixed socket member, and fail-safe means for assuring the operative pivotal movement of the shift lever even when the spherical portion of the shift lever disengages from the socket member accidently, the fail-safe means including a stopper plate member stationarily arranged in the vicinity of the socket member, the stopper plate member having therethrough a stopper opening through which one end portion of the shift lever other than the spherical portion passes, the stopper opening being sized smaller than the spherical portion of the shift lever so that upon disengagement of the spherical portion from the bearing member, the spherical portion becomes engaged with the stopper plate member and is prevented from passing through the stopper opening.

BRIEF DESCRIPTION OF THE DRAWINGS

Other objects and advantages of the present invention will become clear from the following description when taken in conjunction with the accompanying drawings, in which:

FIGS. 5 to 8 are plan views of modified sockets for the first embodiments, showing respective stopper openings formed in the sockets; and FIG. 9 is a partially sectional side view of a shift lever supporting structure of a second embodiment of the present invention.

DETAILED DESCRIPTION OF THE INVENTION

Figure 1:
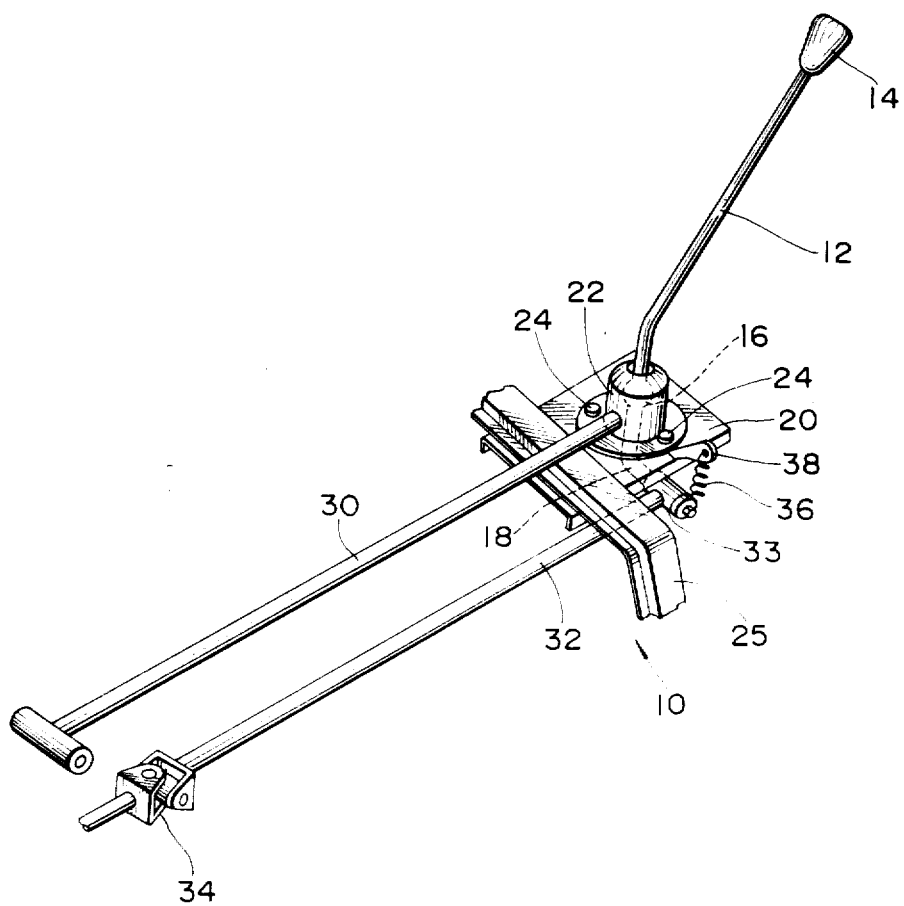
FIG. 1 is a perspective view of a shift lever supporting structure of a first embodiment of the present invention.

Referring to FIGS. 1 to 4, there is shown a first embodiment of the present invention. As is best seen from FIG. 1, the shift lever supporting structure 10 of this first embodiment is constructed to pivotally support thereon a shift lever 12. A knob 14 is fixed to the top of the shift lever 12. The lower portion of the shift lever 12 is bent generally normal to form a normally bent portion 18 and has near the bent portion 18 an enlarged spherical portion 16. For the reason which will become apparent as the description proceeds, the maximum diameter of the spherical portion will be referred to as "D" as is indicated in the drawing.

The shift lever supporting structure 10 comprises generally a platform member 20 to which a cylindrical hollow body 22 is secured by means of bolts 24. As is understood from the drawing, the lower portion of the shift lever 12 passes through the cylindrical hollow body or holding member 22 with the spherical portion 16 thereof held in the same. The platform member 20 has a supporting arm member 25 secured at its middle portion to the platform member 20. The axial both ends of the arm member 25 are connected to reinforced portions of the vehicle body (not shown) through respective shock absorbing devices 26 and 28 (see FIG. 2). Designated by numeral 30 is a supporting rod which has one end secured to the hollow body 22 and the other end secured to a transmission housing (not shown). A control rod 32 is connected at its one end to the normally bent portion 18 of the shift lever 12 through a bearing member 33 and at its other end to the transmission operating mechanism (not shown) through a universal joint 34. A return spring 36 spans between the normally bent end 18 of the shift lever 12 and a bracket 38 extending from the platform member 20, so that the shift lever 12 is biased to assume a predetermined rest or neutral position. With the arrangement as outlined hereinabove, handling the shift lever knob 14 induces pivotal movements of the same about the spherical portion 16 of the lever 12, and induces not only longitudinal movements of the control rod 32 but also twisting movements of the same.

Figure 2:
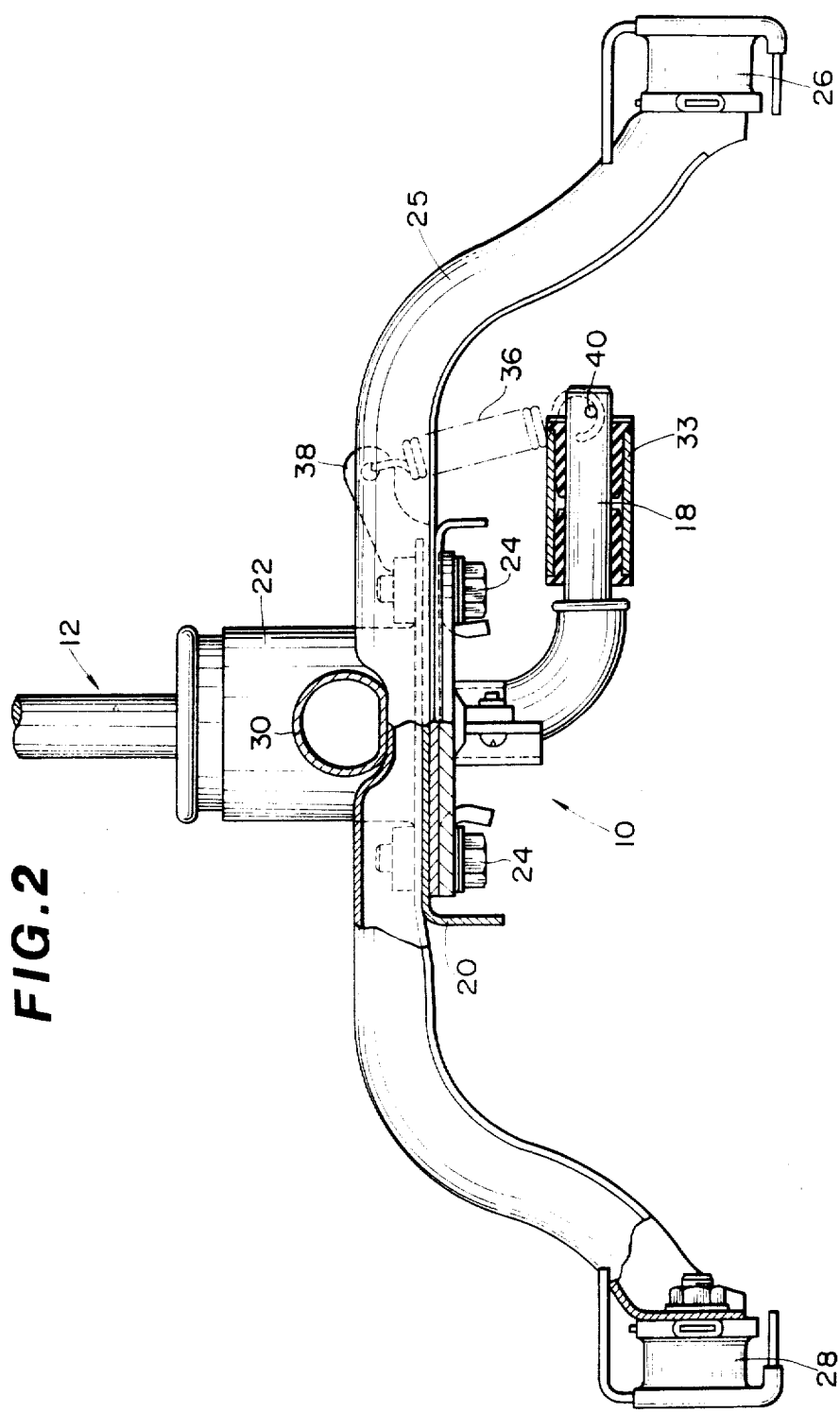
FIG. 2 is a partially sectional and enlarged view of an essential part of the first embodiment.
Figure 3:
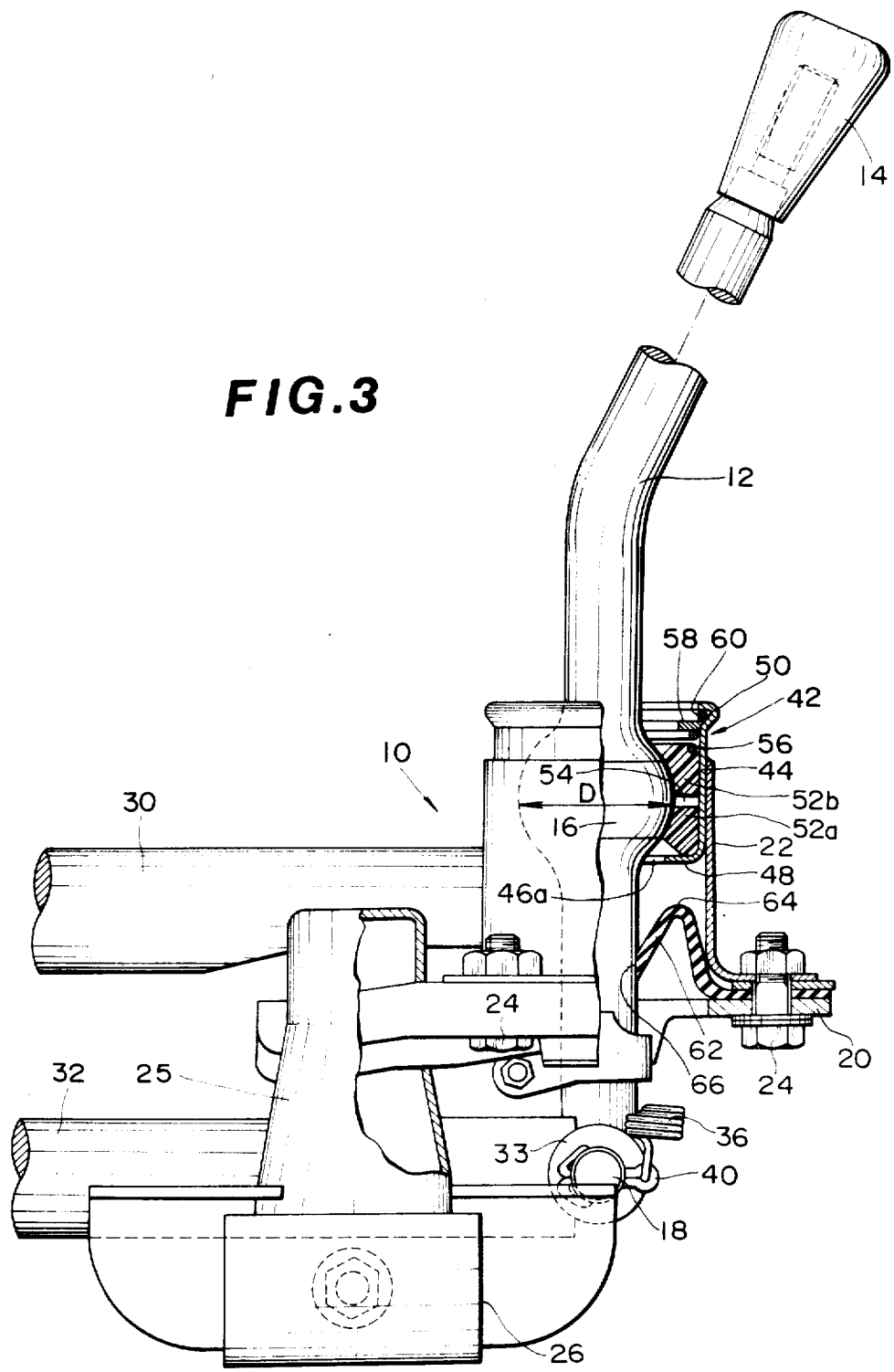
FIG. 3 is a partially sectional side view of the shift lever supporting structure of the first embodiment.

Referring to FIGS. 2 and 3, a detailed construction of the essential part of the shift lever supporting structure 10 is shown. Designated by numeral 40 in these drawings is a retainer pin which is held by the shift lever bent end 18 and holds the end of the return spring 36.

As is seen in FIG. 3, the cylindrical hollow member 22 receives therein a socket 42 welded thereto. The socket 42 holds the spherical portion 16 of the shift lever 12 so that the lever 12 pivots about the spherical portion 16 relative to the fixed socket 42. The socket 42 comprises a collar member 44 which is coaxially disposed in and welded to the upper portion of the hollow member 22. The collar member 44 is formed at its bottom with an opening 46a which is defined by an inwardly extending flange portion 48 of the collar member 44. The upper portion of the collar member 44 is formed with an enlarged diameter portion to provide therewithin an annular groove 50. Within the collar member 44, a pair of circular bearing members 52a and 52b of synthetic resin are coaxially disposed. As is understood from the drawing, each of the bearing members 52a and 52b is formed with a smoothly curved concave inner surface which bears the upper or lower portion of the spherical portion 16 of the shift lever 12. For improved bearing, a certain clearance 54 is left between these two bearing members 52a and 52b. Preferably, the contact surfaces of each bearing member 52a or 52b and the spherical portion 16 of the shift lever 12 are greased. The upper bearing member 52b is biased downward in the drawing by a coil spring 56 seated on a spring seat 58. The spring seat 58 is retained by a snap ring 60 received in the annular groove 50 of the collar member 44. A boot 62 of elastic material is disposed in the lower portion of the hollow member 22, for dust sealing, with its peripheral portion secured to the platform member 20 by the bolts 24. The boot 62 has an annular raised portion 64 about its central opening 66 through which the shift lever 12 passes sealingly.

Figure 4:
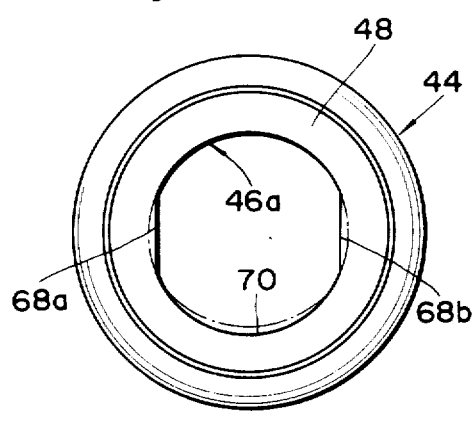
FIG. 4 is a plan view of a socket employed in the first embodiment, showing a stopper opening formed in the socket.

The shape of the bottom opening 46a of the collar member 44 is shown in FIG. 4. The opening 46a has substantially the shape of a circle of diameter "D" which is equal to the maximum diameter of the above-mentioned spherical portion 16 of the shift lever 12. The phantom line shows the circle of diameter "D". However, as is understood from the drawing, the opening 46a has smaller diametrically opposed portions 68a and 68b of diameter slightly less than "D" and a larger portion 70 of diameter slightly larger than "D". As will become clear from the following, the less diameter portions 68a and 68b act as a stopper means for the spherical portion 16 of the shift lever 12.

In the following, the assembling process of the shift lever supporting structure 10 will be described with reference to the corresponding drawings which are FIGS. 1 to 4.

First, the collar member 44 of the socket 42 is secured or welded to the cylindrical hollow member 22, then the hollow member 22 and the boot 62 are bolted to the platform 20 in a manner as shown in FIG. 3. The lower bearing member 52a is put into the collar member 44. The shift lever 12, from its normally bent portion 18, is thrust into the collar member 44 from the top of the same and into the opening 66 of the boot 62 and is moved downwardly turning about the elbow portion where the normally bent portion 18 and the major portion of the shift lever 12 are jointed. With this, the shift lever 12 stands on the lower bearing member 52a, but unstably. Then, the upper bearing member 52b, the coil spring 56, the spring seat 58 and the snap ring 60 are disposed in this order onto the shift lever 12 from the top of the same and moved into the collar member 44. The snap ring 60 is then compressed and put into the groove 50 of the collar member 44. With this procedure, the socket 42 is assembled to pivotally support the spherical portion 16 of the shift lever 12. Then, the normally bent portion 18 is connected through the bearing member 33 to the control rod 32, and the spring 36 is spanned between the retainer pin 40 fixed to the normally bent portion 18 and the bracket 38 extending from the platform member 20.

The shift lever supporting structure 10 constructed as stated hereinabove functions as follows:

When the shift lever 12, viz., the knob 14, is handled for the purpose of gear change of the transmission, it pivots about the spherical portion 16 thereof. Since the bearing member 52b is resiliently biased to bear the spherical portion 16 by the spring 56, a slight displacement of the spherical portion 16 relative to the fixed socket 42, which would occur by the pivotal movement of the shift lever 12, is permitted. This phenomenon provides the shift lever operator with a comfortable shift feeling. The pivotal movement of the shift lever 12 is transmitted to the control rod 32 and induces the longitudinal and/or twisting movement of the same, as is mentioned hereinafore.

In the invention, the following advantageous phenomenon is expected, which is a so-called "fail-safe function".

When, by accident, the spherical portion 16 of the shift lever 12 slips out of the bearing members 52a and 52b during the shifting operation of the shift lever 12, the spherical portion 16 moves down inevitably and comes into engagement with the diametrically opposed portions 68a and 68b of the bottom wall 48 of the socket 42. Because of the dimensional difference between the spherical portion 16 and the opening 46, the spherical portion 16 is prevented from passing through the opening 46. That is, under this condition, the spherical portion 16 is supported by the perforated bottom wall 48. With the convexly curved surface thereof, the spherical portion 16 can be pivotally movable relative to the bottom wall 48. This means that the function of the shift lever 12 to effect the transmission gear change is still assured even when the above-mentioned disengagement occurs. In fact, when the bearing members 52a and 52b are constructed of plastics, there is a fear of the above-mentioned disengagement, originating from deterioration of the plastic bearing members 52a and 52b long used.

Other shapes of the bottom opening 46 of the collar member 44 are shown in FIGS. 5 to 8, respectively. In the drawings, the phantom line shows the circle of diameter "D" which is equal to the maximum diameter of the spherical portion 16 of the shift lever 12. As is understood from these drawings, similar to the case of the collar member 44 of FIG. 4, the bottom openings of these collar members have substantially the shape of a circle of diameter "D". Because of the same reason as mentioned hereinabove, in cases of these shapes, the spherical portion 16 of the shift lever 12 is assuredly supported by the bottom wall 48 of the collar member 44 even when the spherical portion 16 slips out of the originally installed bearings 52a and 52b.

Figure 5:
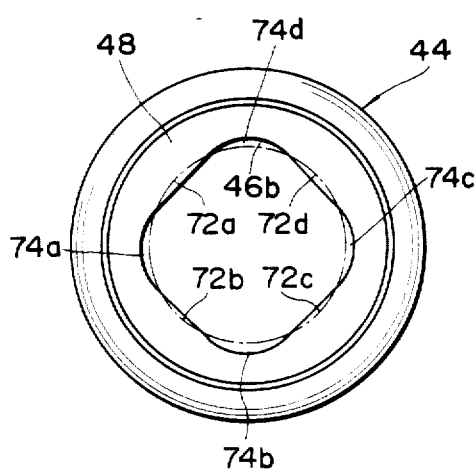

In FIG. 5, the opening 46b of the collar member 44 has four smaller evenly spaced portions 72a, 72b, 72c and 72d of diameter slightly less than "D" and four larger evenly spaced portions 74a, 74b, 74c and 74d of diameter slightly larger than "D".

Figure 6:
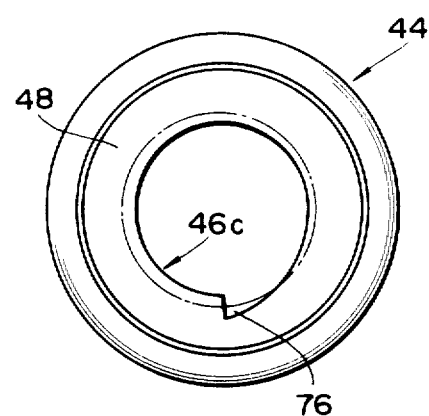

In FIG. 6, the opening 46c of the collar member 44 has substantially the shape of a circle of diameter slightly less than "D", but has a portion 76 at which the diameter abruptly increases to a value slightly larger than "D".

Figure 7:
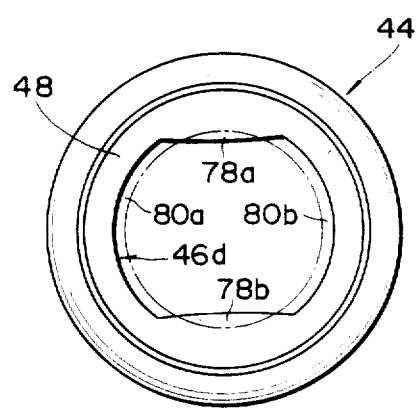

In FIG. 7, the opening 46d has smaller diametrically opposed portions 78a and 78b of diameter slightly less than "D" and larger diametrically opposed portions 80a and 80b of diameter slightly larger than "D". As is understood from this drawing, the inner side of each portion 78a or 78b is slightly curved convexly, and the arc of each enlarged portion 80a or 80b is concentric with the circle of diameter "D".

In FIG. 8, the opening 46e has smaller diametrically opposed portions 82a and 82b of diameter slightly less than "D" and larger diametrically opposed portions 84a and 84b of diameter slightly larger than "D". The inner side of each portion 82a or 82b is straight.

Referring to FIG. 9 of the drawings, there is shown a second embodiment 10' of the present invention. Identical parts to those of the first embodiment of FIG. 3 are designated by the same numerals. In the second embodiment, the opening 46f of the collar member 44 is sized larger than the maximum diameter of the spherical portion 16 of the shift lever 12 so that the spherical portion 16 can pass through the opening 46f. As a fail-safe means, a stopper plate 86 having a central opening 88 is used. As is shown in the drawing, the stopper plate 86 is disposed at the bottom portion of the cylindrical hollow member 22 and secured to the platform member 20 by bolts 24. Denoted by numeral 90 is a boot of elastic material, which has a downwardly extending portion 92 about a central opening 94 thereof through which the shift lever 12 passes sealingly.

The opening 88 of the stopper plate 86 is sized smaller than the maximum diameter of the spherical portion 16 of the shift lever 12 so that the spherical portion 16 can not pass through the opening 88. Preferably, the opening 88 has the shape of a circle of diameter slightly less than "D" which is the diameter of the spherical portion 16. Of course, the before-mentioned shapes of the opening may be also employed in this second embodiment.

Assembling process of the second embodiment is as follows:

First, the collar member 44 of the socket 42 is welded to the cylindrical hollow member 22, then the hollow member 22, the stopper plate 86 and the boot 90 are bolted to the platform member 20 in a manner as shown in the drawing. The lower bearing member 52a is put into the collar member 44. The shift lever 12, from its normally bent portion 18, is thrust into the collar member 44 from the top of the same and into the opening 88 of the stopper plate 86 and is moved downwardly turning about the elbow portion where the normally bent portion 18 and the major portion of the shift lever 12 are jointed. With this, the shift lever 12 stands on the lower bearing member 52a, but unstably. Then, the upper bearing member 52b, the coil spring 56, the spring seat 58 and the snap ring 60 are disposed in this order onto the shift lever 12 from the top of the shift lever 12 and moved into the collar member 44. The snap ring 60 is then compressed and put into the groove 50 of the collar member 44. With this procedure, the socket 42 is assembled to pivotally support the spherical portion 16 of the shift lever 12. Then, the normally bent portion 18 is connected through the bearing member 33 to the control rod 32, and the spring 36 is spanned between the retainer pin 40 fixed to the normally bent portion 18 and the bracket 38 extending from the platform member 20.

Since the normal function of the shift lever supporting structure 10' of the second embodiment is substantially the same as that of the first embodiment 10, description of it will be omitted. When, however, the spherical portion 16 of the shift lever 12 slips out of the bearing members 52a and 52b by accident, the spherical portion 16 moves down and passes through the bottom wall opening 46f of the collar member 44 and comes into engagement with the stopper plate 86. Because of the dimensional difference between the spherical portion 16 and the opening 88, the spherical portion 16 is prevented from passing through the opening 88. Thus, the spherical portion 16 is pivotally supported on the stopper plate 86 in such condition. Thus, the function of the shift lever 12 to effect the transmission gear change is still assured even when the above-mentioned disengagement occurs.

As is understood from the foregoing description, in accordance with the present invention, there is proposed a fail-safe means which can operatively or pivotally support the shift lever when the shift lever is disengaged from the originally installed bearing construction.

What is claimed is:

1. A shift lever supporting structure for pivotally supporting a shift lever secured to a rigid structure of a vehicle body, said lever being formed with an enlarged spherical portion, said shift lever supporting structure comprising:
   a hollow member secured to said rigid structure, said hollow member having a bottom portion;
   a fixed collar member secured to said hollow member;
   a bearing member held in said collar member and receiving therein the spherical portion of said shift lever so that said shift lever is pivotal about the spherical portion thereof relative to the fixed collar member; and
   fail-safe means for assuring the operative pivotal movement of said shift lever even when said spherical portion of the shift lever slips out of said collar member accidently, said fail-safe means including a stopper plate member disposed in the bottom portion of said hollow member and having therethrough a stopper opening through which one end portion of said shift lever passes, said stopper opening having substantially the shape of a circle having a diameter which is equal to the maximum diameter of said spherical portion of said shift lever, a portion of the periphery of said stopper opening projecting within the diameter of the circle so that, upon disengagement of said spherical portion from said bearing member of the fixed collar member, said spherical portion of the shift lever is brought into pivotal engagement with a portion of the periphery of the stopper opening and prevented from slipping out of said opening.

2. A shift lever supporting structure as claimed in claim 1, in which said stopper opening has substantially the shape of a circle of diameter which is equal to the maximum diameter of said spherical portion of said shift lever.

3. A shift lever supporting structure as claimed in claim 2, in which said stopper opening has smaller diametrically opposed portions of diameter slightly less than the diameter of said spherical portion of the shift lever and an enlarged portion of diameter slightly larger than the diameter of said spherical portion.

4. A shift lever supporting structure as claimed in claim 2, in which said stopper opening has four smaller evenly spaced portions of diameter slightly less than the diameter of said spherical portion of the shift lever and four larger evenly spaced portions of diameter slightly larger than the diameter of the spherical portion.

5. A shift lever supporting structure as claimed in claim 2, in which said stopper opening has substantially the shape of a circle of diameter slightly less than the diameter of said spherical portion and has a portion at which the diameter thereof abruptly increases to a value slightly larger than the diameter of said spherical portion.

6. A shift lever supporting structure as claimed in claim 2, in which said stopper opening has smaller diametrically opposed portions of diameter slightly less than the diameter of the spherical portion of said shift lever and larger diametrically opposed portions of diameter slightly larger than the diameter of said spherical portion.

7. A shift lever supporting structure as claimed in claim 6, in which the inner side of each of the smaller diametrically opposed portions is slightly curved convexly, and the arc of each of the larger diametrically opposed portions is concentric with the circle of the imaginary circle of the stopper opening.

8. A shift lever supporting structure as claimed in claim 6, in which the inner side of each of the smaller diametrically opposed portions is straight.

* * * * *